United States Patent [19]

Greenley et al.

[11] Patent Number: 5,802,575
[45] Date of Patent: Sep. 1, 1998

[54] HIT BIT FOR INDICATING WHETHER LOAD BUFFER ENTRIES WILL HIT A CACHE WHEN THEY REACH BUFFER HEAD

[75] Inventors: Dale Greenley, Los Gatos; Leslie Kohn, Fremont; Ming Yeh; Greg Williams, both of Palo Alto, all of Calif.

[73] Assignee: Sun Microsystems, Inc., Palo Alto, Calif.

[21] Appl. No.: 946,611

[22] Filed: Oct. 7, 1997

Related U.S. Application Data

[63] Continuation of Ser. No. 389,636, Feb. 16, 1995, Pat. No. 5,745,729.

[51] Int. Cl.$^6$ .................................................. G06F 12/00
[52] U.S. Cl. ............................ 711/144; 711/140; 711/131
[58] Field of Search .............................. 395/859; 711/3, 711/137, 140, 141, 144, 145, 131

[56] References Cited

U.S. PATENT DOCUMENTS

| | | | |
|---|---|---|---|
| 5,056,002 | 10/1991 | Watanabe | 711/119 |
| 5,283,890 | 2/1994 | Petolino, Jr. et al. | 711/122 |
| 5,404,484 | 4/1995 | Schlansker et al. | 711/133 |
| 5,467,473 | 11/1995 | Kahle et al. | 395/800.23 |
| 5,471,598 | 11/1995 | Quattromani et al. | 711/122 |
| 5,542,062 | 7/1996 | Taylor et al. | 711/3 |

*Primary Examiner*—Eddie P. Chan
*Assistant Examiner*—Kevin Verbrugge
*Attorney, Agent, or Firm*—Limbach & Limbach L.L.P.

[57] ABSTRACT

A dual-ported tag array of a cache allows simultaneous access of the tag array by miss data of older LOAD instructions being returned during the same cycle that a new LOAD instruction is accessing the tag array to check for a cache hit. Because a load buffer queues LOAD instructions, the cache tags for older LOAD instructions which missed the cache return later when new LOAD instructions are accessing a tag array to check for cache hits. A method and apparatus for calculating and maintaining a hit bit in a load buffer perform the determination of whether or not a newly dispatched LOAD will hit the cache after it has been queued into the load buffer and waited for all older LOADs to be processed. A load buffer data entry includes the hit bit and all information necessary to process the LOAD instruction and calculate the hit bits for future LOAD instructions which must be buffered. A method and apparatus for servicing LOAD instructions, in which the access of the data array portion of a cache and the tag array portion are decoupled, allows the delayed access of the data array after a LOAD has been delayed in the load buffer without reaccessing the tag array.

12 Claims, 6 Drawing Sheets

HIT BIT FOR INDICATING WHETHER LOAD BUFFER ENTRIES WILL HIT A CACHE WHEN THEY REACH BUFFER HEAD

This is a continuation of application Ser. No. 08/389,636, filed Feb. 16, 1995, now U.S. Pat. No. 5,745,729.

BACKGROUND OF THE INVENTION

1. Field of the Invention

The present invention relates to the load/store unit of a processor. Specifically, the present invention relates to load buffer and cache maintenance.

2. Discussion of the Prior Art

RISC stands for Reduced Instruction Set Computing. RISC processors normally include fewer instructions than their CISC (Complex Instruction Set Computing) predecessors. At least to some extent, the use of RISC technology simplifies the task of writing compilers for the RISC processors, since there are fewer instructions to use. Moreover, the processor design can focus on implementing and optimizing the important, frequently-used instructions, rather than having some complex, seldom-used instruction constrain the maximum operating frequency. For these reasons and others, RISC processors are gaining popularity amongst workstation and even lower-end computer makers.

In a RISC processor, it is common that very few instructions actually access memory. In fact, some implementations may have only two instructions, LOAD and STORE, that access memory. Typically, a few specialized "atomic" operations may also be supported by the processor for synchronization and memory updates by concurrent processes. See *The SPARC Architecture Manual, Version 9*, SPARC International, Inc., D. L. Weaver and T. Germond, Editors, PTR Prentice Hall, 1994, p.17. Even in such cases, the LOAD and STORE are by far the most frequently-used memory access instructions. The execution of a LOAD instruction will cause a processor register to be written with data resident in a main memory address. The execution of a STORE instruction will cause a main memory address to be written with data resident in a processor register. Therefore, LOAD and STORE instructions need to specify a register or registers and a memory address as operands. In some implementations, two registers or a register and an immediate value are used to calculate the memory address. Many implementations provide several varieties of LOADs and STOREs which transfer one or more words of data using one instruction; therefore, more than one source or destination register may exist. These source or destination registers are also designated as operands in the STORE or LOAD instructions, respectively.

Figure 1:
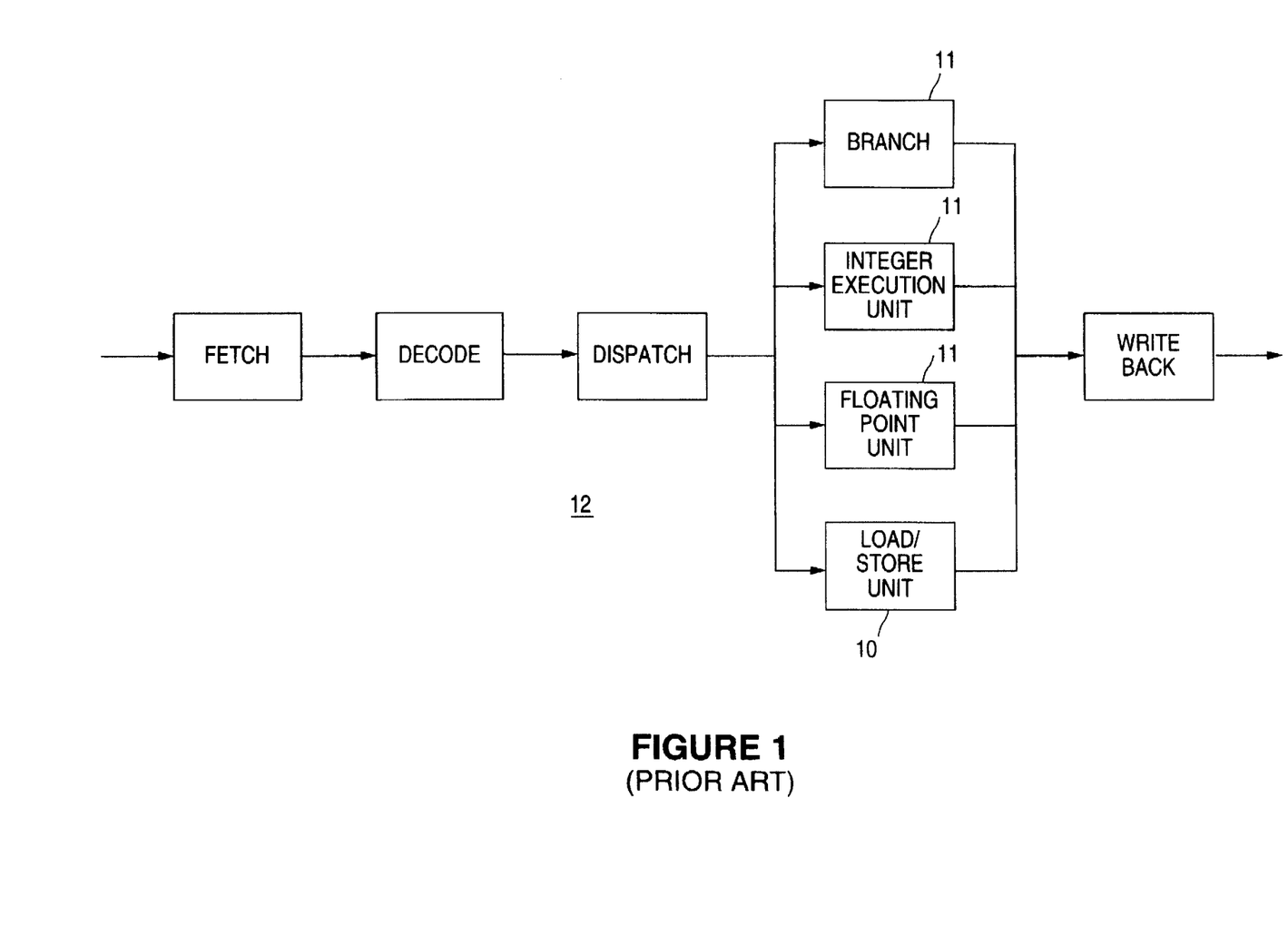
FIG. 1 is a simplified block diagram of a superscalar processor.

Referring to FIG. 1, a superscalar processor 12 is shown. The superscalar processor 12 has several parallel functional units 10 and 11. Some typical superscalar implementations include floating point, integer, branch, and load/store functional units. Thus, up to four instructions may be executed in parallel. Most superscalar processors will also be pipelined at least to some extent. Pipelining allows the processing of instructions to occur in stages, so that it takes several clock cycles before the processing of an instruction is completed. However, in a pipelined processor architecture, several instructions can be simultaneously processed since each stage is always processing an instruction.

Figure 2:
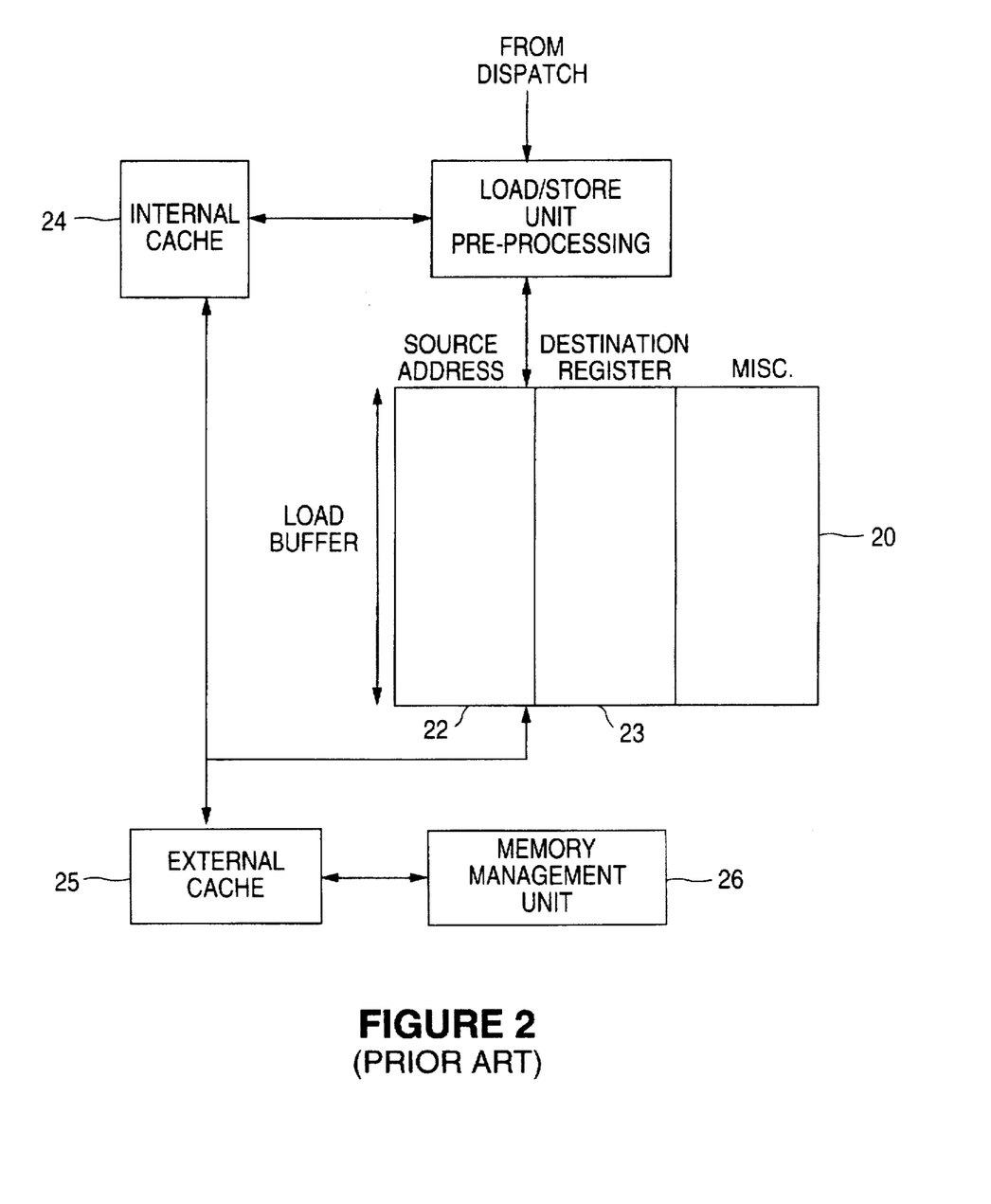
FIG. 2 is a simplified block diagram of a load functional unit.

Referring to FIG. 2, a simplified block diagram of the load/store unit 10 is shown. In order to maximize the total throughput of the load/store functional unit 10, a load buffer 20 is provided so that LOADs that cannot be immediately serviced can still be dispatched, and can wait to be serviced without holding up the operation of the processor 12. The load buffer 20 is a first-in-first-out (FIFO) queue which holds LOAD source memory 22 and destination register addresses 23. By maintaining a queue for LOADS, the utilization of memory resources used by the LOAD and STORE instructions is maximized since another LOAD operation is immediately available after the current LOAD operation is finished.

Caching is a general technique for exploiting the locality of reference using multi-level memory systems. The basic idea is to organize a small amount of fast access memory and a large amount of slower access memory so that most of the accesses go to the small, fast memory. The average access time of such a memory system may be only slightly greater than that of the small, fast memory, while its effective size is that of the large memory.

A common form of multi-level memory system is cache memory, or lookaside buffer memory. A cache memory is a relatively small, specialized memory device placed between the processor and main memory. The cache memory holds copies of words from memory that are likely to be accessed by the processor. The cache is faster than main memory; thus if frequently accessed locations are found in the cache, the hit rate will be high and the average memory access time will be small. The strategy followed by the cache is to hold words located near other words recently used by the processor. The locality of reference exploited by this strategy is the propensity of memory accesses, over short periods of time, to cluster in small regions of memory.

Cache memory locations are redundant, in the sense that each is used to provide a more accessible copy of information also stored in slower main memory. Thus, the total addressable memory size, as seen by the programmer, is not increased by the presence of a cache. Rather, the cache provides, in a program transparent way, an improvement in the average access time to locations in the same address space.

As the cache is much smaller than main memory, only a minority of the main memory locations can be cached at any one time. Consequently, in the general case each location in the cache, or cache line, conceptually has two parts: a tag field and a contents field. When a read or write operation is requested, the desired address is compared with the tag field of certain lines of the cache. If a match is found, the contents field of the cache line containing the matching tag is read or written. There is no need to access main memory. This is known as a cache hit.

The load/store unit shown in FIG. 2 executes all LOAD instructions, and is generally responsible for all interfaces with memory. As shown in FIG. 2, the load/store unit manages a first level internal on-chip cache 24. The load/store unit interfaces with a second level external cache 25 which connects to a memory management unit 26. The first level cache 24 is a direct mapped cache, in which the address of the location to be cached maps to a specific location within the cache.

The theory behind the load buffer 20 is that for code which has a working set that is too large to fit in the internal cache 24, a LOAD instruction and its succeeding use can be separated, at least far enough to cover the latency of the external cache 25. Thus, the load buffer 20 allows the load/store functional unit 10 (in FIG. 1) and the other functional units to be somewhat decoupled in that LOADs which cannot return data immediately will not stall the pipeline, but rather, be buffered until they can. A typical example of this is when a LOAD misses the on-chip data cache 24 and must access the external cache 25. In this case, the LOAD will be placed in the load buffer 20, and the execution pipelines will continue moving so long as they do not require the register that is being loaded, or in other words, as long as they do not encounter a "use" instruction.

Figure 3:
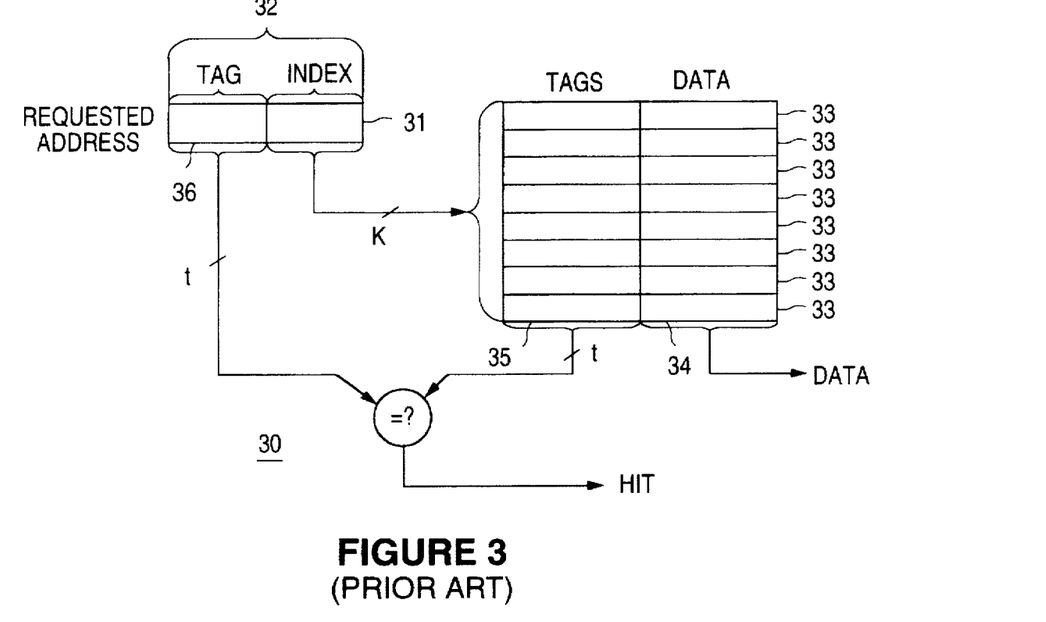
FIG. 3 illustrates the operation of a direct mapped cache.

FIG. 3 illustrates a non-associative or direct mapped cache 30. The direct mapped cache 30 uses the low-order bits 31 of the incoming memory address 32 to dictate the address within the cache 30 to examine for a hit. These bits are called the index into the cache. Thus, a memory location A can only reside in the cache line 33 whose address within the cache 30 is the low k bits 31 of the address 32 of A. While allowing a memory address 32 to be cached in only one line within the cache 30 is a serious constraint, it allows the use of cheaper and denser standard Random Access Memory (RAM) rather than associative memory. Another important and attractive characteristic of a direct-mapped cache is that it tends to operate faster given that it is simpler and require less circuitry. The cache line constraint implies, however, that memory locations which share the same k low-order address bits 31 also share the same cache line 33. If each cache line 33 only provides for the storage of the contents of one memory location, then two memory locations with the same low order k address bits 31 cannot be cached simultaneously, since they contend for the same cache line 33. Within each cache line 33, the data 34 is stored along with a tag 35. In a simple addressing scheme, the tag 35 is merely be the upper order address bits of the memory location stored in that line of the cache 30. In order to determine if a cache hit has occurred, the upper order address bits of the incoming memory address 36 are compared to the tag 35 stored in the location mapped to by the low order bits of the incoming memory address 31. If the tag 35 stored in the cache line 33 indexed by the low order bits 31 matches the upper order bits of the incoming memory address 36, there is a cache hit.

Figure 4:
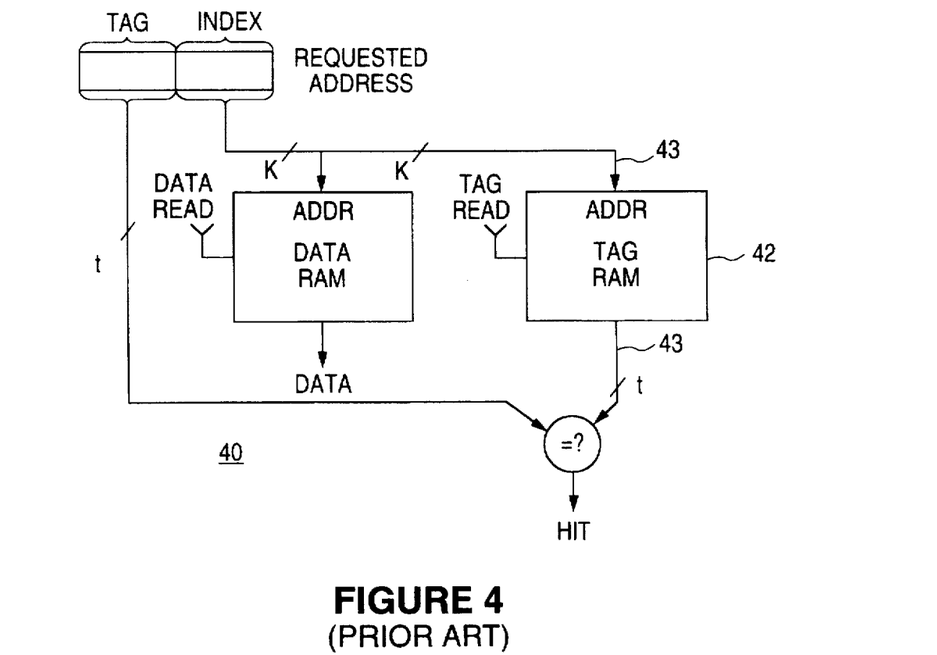
FIG. 4 illustrates an implementation of a direct mapped cache.

The internal cache 40 in FIG. 4 is depicted as consisting of two separate memories, a data memory 41 and a tag memory 42. Conceptually, the behavior is exactly like that of the cache 30 shown in FIG. 3 since both the data 41 and the tag 42 portions are indexed in the same way and have the same number of lines. Each data line in the data array 41 has a corresponding tag in the corresponding location of the tag array 42.

Referring again to FIG. 2, when load data is returned from the external cache 25, that data is written into the internal cache 24. The rationale behind this replacement strategy is that recently used data is likely to be used again in the near future. Writing into the internal cache 24 means that an appropriate line in both the data RAM 41 (in FIG. 4) and the tag RAM 42 (in FIG. 4) must be altered.

When a LOAD is dispatched, the load/store unit 10 (in FIG. 1) performs a check to see if the requested memory location is in the internal cache 24. In order to determine if a hit has occurred, the proper tag is retrieved from the tag RAM 42 (in FIG. 4) and compared to the proper portion of the address for the requested location. While these tag retrievals are occurring, older LOAD instructions which missed the internal cache 24 may be returning data and tag information. Since most cache replacement strategies call for the inclusion of the most recently referred data in the cache 24, the internal cache 24 must be updated to hold the data and tags returned from these previous misses, so that if the same locations are requested again, they will hit the internal cache 24. Because there is a non-zero latency to the external cache 25, and because the load buffer 20 tends to delay the servicing of LOADS which must access the external cache 25, the return of data from the external cache 25 occurs several cycles after the LOAD was placed in the load buffer 20. If a new LOAD is being dispatched during the same cycle that an older LOAD is returning data from the external cache 25, a conflict arises over the internal cache tag RAM data port 43 (in FIG. 4).

The problem with the prior art is that a throughput of one LOAD per cycle cannot be achieved if any of the LOADs miss the internal cache 24. Because tight loops of code will undoubtedly issue one LOAD per cycle, it is important to be able to sustain a throughput of one load per cycle even if all the LOADs miss the internal cache 24. If a newly dispatched LOAD needs access to the tag RAM port 43 (in FIG. 4) to check for an internal cache hit during the same cycle that another LOAD at the head of the load buffer queue 20 is returning data to the internal cache 24 because of a previous internal cache miss, only one of them can be processed during that cycle. If one LOAD per cycle is issued, the tag RAM data port 43 (in FIG. 4) will be utilized during every cycle to check for an internal cache hit. Thus, older LOADs from the load buffer cannot access the tag RAM to write returned load data. If one LOAD is issued per cycle, in the long run, the processor will stall when one of the incoming LOADs misses the internal cache 24, and then all subsequent LOADs are queued in the load buffer 20. Since LOADs in the load buffer 20 cannot gain access to the tag RAM port 43 (in FIG. 4), the load buffer 20 will not successfully service any of the LOADs it holds. When enough of the LOADs have accumulated in the load buffer 20 so that the load buffer 20 is full, the processor 12 (in FIG. 1) will stall during the next cycle when a LOAD cannot be dispatched.

SUMMARY OF THE INVENTION

In a load store unit of a processor, a sustained throughput of one LOAD instruction per cycle is desired to prevent the processor from stalling when executing an instruction stream that contains a LOAD instruction in every cycle.

Because a load buffer queues LOAD instructions, the cache tags for older LOAD instructions which missed the cache return later when new LOAD instructions are accessing a tag array to check for cache hits. Thus, the old return tags and new LOADs contend for the tag array of the cache. According to the present invention, a dual-ported tag array of a cache allows simultaneous access of the tag array by miss data of older LOAD instructions being returned during the same cycle that a new LOAD instruction is accessing the tag array to check for a cache hit.

In order to decouple the tag array access from the data array access in a cache of a load/store unit, a method and apparatus for calculating and maintaining a hit bit in a load buffer perform the determination of whether or not a newly dispatched LOAD will hit the cache after it has been queued into the load buffer and has waited for all older LOADs to be processed. Thus, the tag RAM does not need to be reaccessed when the LOAD reaches the head of the load buffer queue.

The data structure in the load buffer facilitates the methods and apparatuses of the present invention. A load buffer data entry includes the hit bit and all information necessary to process the LOAD instruction and calculate the hit bits for future LOAD instructions which must be buffered.

A method and apparatus for servicing LOAD instructions, in which the access of the data array portion of a cache and the tag array portion are decoupled, allows the delayed access of the data array after a LOAD has been delayed in the load buffer without reaccessing the tag array. Thus, a sustained throughput of one LOAD instruction per cycle can be achieved.

When a LOAD will miss the first level cache when it reaches the head of the queue position in the LOAD buffer, and each of the outstanding older LOADs in the load buffer will be first level cache hits upon reaching the head of the load buffer queue, the access to the external cache for the LOAD which will miss the first level cache can be started before that LOAD reaches the head of the load buffer queue position. A second level cache pointer refers to the load buffer entry containing the oldest outstanding LOAD that can access the external cache. Thus, according to the present invention, a method and apparatus allow accesses to the first level cache and second level cache to occur simultaneously for two separate LOADs in the load buffer.

DETAILED DESCRIPTION OF THE INVENTION

Modern processors support virtual address space, which is distinct from physical address space. A virtual address is a label that the processor uses to specify a memory location. The processor is not concerned with where that memory location actually resides in the physical memory, so long as the processor is able to access the location with the virtual address. A processor architecture specification defines a certain virtual address space which must be supported. The operating system which manages the computer system has flexibility as to how that virtual address space is mapped to physical memory. Thus, there is a translation that must occur from virtual to physical address.

Figure 5:
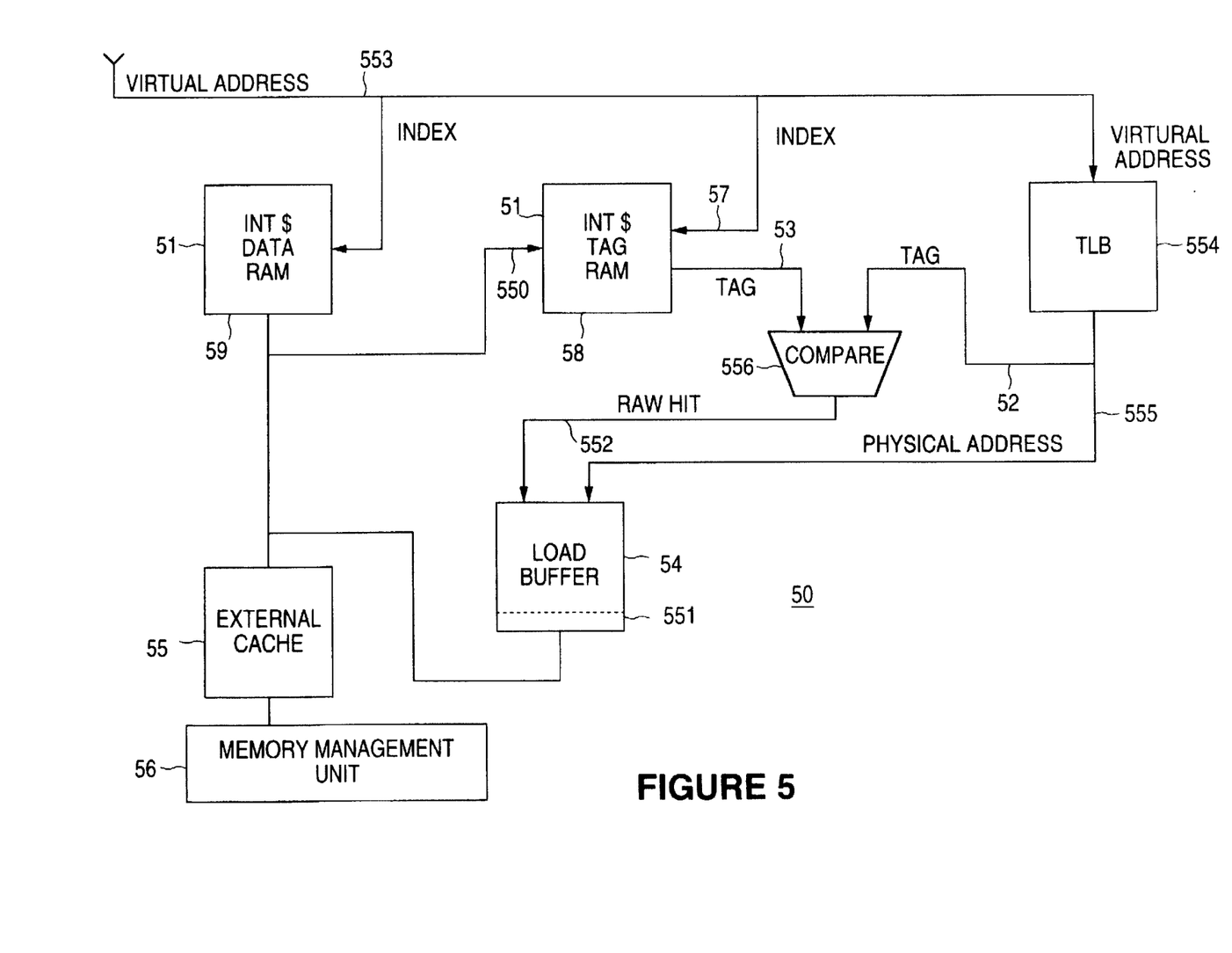
FIG. 5 is a simplified block diagram of a load functional unit according to the present invention.

FIG. 5 is a simplified block diagram of a functional unit 50 according to the present invention. The internal cache 51 is virtually indexed and physically tagged. In a virtually indexed cache, the low order bits of the virtual address are used to provide the direct mapping, or index, into the cache line. However, the tags are the upper order physical address bits. Thus, in order to determine if a cache hit has occurred, the upper order physical address bits 52 are compared to the tag 53 stored in the tag field for the cache line referred to by the index.

Outstanding LOADs should be executed in order. If a sequence of LOADs exists in the instruction stream, the data that those LOADs return should be written into the register file in the order in which they existed in the instruction stream. If LOADs were allowed to return out of order, older LOADs might destroy the results of younger LOADs, when the programmer expected the exact opposite to occur. When a LOAD misses the internal cache 51, it is queued into the load buffer 54. During the next cycle, a LOAD may be dispatched which is a hit in the internal cache 51. Normally, this would result in the immediate retrieval and return of the data from the internal cache 51. However, because an outstanding older LOAD exists which must access the external cache 55 or main memory through the memory management unit 56, the younger LOAD must be queued in the load buffer 54 so that it is not returned until the outstanding older LOAD returns. A second, and perhaps more important, reason why LOADs should return data in order is that out of order LOAD execution substantially increases the complexity of the load/store unit, since software traps and interrupts become difficult to implement.

LOADs in the load buffer are tagged primarily to deal with exceptional conditions like software traps or interrupts, so that a load matures when it successfully goes through all pipelined processor stages. If an exceptional condition happens before this time, any immature LOADs have to be vaporized, and the load buffer "rewound."

The load buffer 54 returns data in order to the registers. If an older LOAD is waiting for access to the external cache 55, one way to service a younger LOAD which hit the internal cache 51 is to retrieve the data for the younger LOAD and buffer the data until the older LOAD had returned its data. However, this option is prohibitively expensive, since a LOAD may return several words of data, and since several LOADs may require buffering. The amount of area necessary to buffer all this load data is too large to make this option practical.

According to the present invention, instead of buffering the load data from younger LOADs while waiting for older LOADs to return from the external cache, the load buffer 54 instead records whether the younger LOAD hit or missed the internal cache 51 and later re-accesses the internal cache 51 if it was an internal cache 51 hit. The only memory port that is required for the hit/miss determination is the tag port 57 of the internal cache 51. Therefore, when the load buffer 54 is not empty, newly-dispatched LOADs coming down the pipeline access only the tag RAM portion 58 of the internal cache 51. Subsequently, when a LOAD comes to the head of the load buffer queue 54 and is recorded as having hit the internal cache 51, it accesses only the data portion 59 of the internal cache 51 so that newly dispatched LOADs, using the tag RAM 58, are not affected.

In order to fully update the internal cache 51, both the tag RAM 58 and the data RAM 59 must be written when load data is returned from the external cache 55. When the load buffer 54 is not empty, the data RAM port of the internal cache 51 is usable for older LOADs that missed the internal cache 51 and are filling (or allocating) the internal cache 51 upon returning from the external cache 55. However, the tag port 57 is unavailable because it must be used by newly dispatched LOADs to check for a hit. According to the present invention, in order to prevent stalling the processor 12 (in FIG. 1) and in order to achieve optimal performance, the internal cache tag RAM 58 contains a second port 550 dedicated primarily for filling the tag RAM 58 with data returned from old LOADs in the load buffer 54 which accessed the external cache 55. Thus, the first tag RAM port 57 can be used by newly dispatched LOADs to check for an internal cache 51 hit, while the second tag RAM port 550 can be simultaneously used to fill the tag RAM 58 with the tags of locations returned from older LOADs in the load buffer 54.

The second tag RAM port 550 is also useful in multi-level cache and/or multi-processing environments. "Snoops,"

which are transactions which ensure cache consistency, can use this port 550 without stopping instructions from being issued. If the load buffer is empty, the LOADs can be serviced in parallel with the snoop. If the load buffer is not empty, the LOADs are queued normally with recorded hit bits. In this case, there is a special mechanism to make sure that these hit bits are affected properly by the snoop.

According to the present invention, each entry transferred into the load buffer 54 has a "hit bit" 60 (in FIG. 6) which indicates whether or not the tag for the requested location was in the tag RAM when the LOAD was initially dispatched into the load/store unit 10 (in FIG. 1). When a LOAD which has been queued into the load buffer 54 finally reaches the head of the queue 551, the data array will be accessed blindly by the load buffer 54 if the hit bit is asserted. During the interim time that transpires between the initial hit/miss determination and the time the LOAD reaches the head of the load buffer queue 551, several events could occur which would alter the hit/miss status of a given LOAD. Therefore, it is important that the internal cache 51 hit information be logged and maintained properly as these events occur.

The events which affect the hit bit 60 (in FIG. 6) alter the state of the internal cache 51 after a LOAD has accessed the tag array 58 but before it accesses the data array 59. The first event occurs when an older LOAD's allocation replaces the internal cache line contents of the line mapped to by the source address of a younger LOAD in the load buffer 54. This would turn an internal cache hit into an internal cache miss. For instance, consider the following program fragment in which addresses X and Y directly map to the same internal cache line. LOAD X,r0 is a request that the contents of memory address X be loaded into register r0.

---
LOAD W,r1;
LOAD X,r1;
LOAD Y,r2;
LOAD Z,r3.
---

Assume that prior to the execution of the first LOAD instruction, Y was cached in the internal cache 51. Additionally assume that the first LOAD resulted in an internal cache miss. When the second LOAD is dispatched, a miss occurs, because Y (not X) is occupying the relevant cache line. The second LOAD is sent to the load buffer 54, and it sits behind the first LOAD instruction which is currently accessing the external cache 55. Now the third LOAD is dispatched. The third LOAD hits the internal cache 51, because Y is in the internal cache 51. When the first LOAD missed, the subsequent LOADs must be buffered in the load buffer 54 even if they hit the internal cache 51 in order to maintain the proper ordering of the return of load data. So, the third LOAD is entered into the load buffer 54 and is behind the second LOAD. After the external cache 55 returns the first LOAD, the second LOAD begins accessing the external cache 55. When the second LOAD returns, it allocates (or fills) the relevant internal cache line. When the third LOAD reaches the head of the load buffer queue 551, the data it desires is no longer in the internal cache 51 because the second LOAD wrote over its line in the internal cache 51. Therefore, the third LOAD was transformed from a hit into a miss by the older second LOAD.

Another event which can affect the hit/miss status of a LOAD in the load buffer 54 is the allocation of the desired data by an older LOAD. This would have the effect of turning an internal cache miss into an internal cache 51 hit. For example, consider the following program fragment.

---
LOAD W,r1;
LOAD X,r2;
LOAD X,r3;
---

Assume that neither W nor X were in the internal cache 51. When the first LOAD is dispatched, a miss occurs, and the first LOAD is buffered in the load buffer 54. When the second LOAD is dispatched, a miss occurs, and the second LOAD is sent to the load buffer 54 behind the first LOAD, which is currently accessing the external cache 55. When the third LOAD is dispatched, another miss occurs, because X still is not in the internal cache 51. However, when the second LOAD reached the head of the load buffer 54 queue and fills the internal cache 51, X will thereafter be in the internal cache 51. Thus, the third LOAD will not need to go to the external cache 55 for X. Instead, the miss for the third LOAD was transformed into a hit by the second LOAD.

According to a the present invention, for the LOAD at the head of the load buffer queue 551, access to the external cache 55 can be started as soon as the previous LOAD has finished using the external cache 55, since the hit/miss status of the LOAD is known. In some cases, access to the external cache 55 can even occur earlier. For example, if the LOAD at the head of the queue 551 has an asserted hit bit 60 (in FIG. 6), it does not need to access the external cache 55. Thus, if the LOAD behind it has a deasserted hit bit 60 (in FIG. 6), the LOAD behind the head of the load buffer 54 queue can begin to access the external cache 55. To accomplish this strategy, an external cache pointer is used to specify the oldest load buffer entry which needs to access the external cache 55. In the presence of external cache misses or exceptions, the external cache pointer provides the load/store unit with the ability to rewind while backwards while skipping over younger LOADs which hit the internal cache.

The load buffer 54 design is based on knowing the hit or miss status once the LOAD has entered the load buffer 54, so that the external cache 55 access can be started as soon as possible. Both the cases enumerated above, in which the hit status of a LOAD upon reaching the head of the load buffer queue 551 is different from its initial status when it accessed the tag RAM 58, are the results of older LOADs' affect on the internal cache 51. Therefore, the hit bit 60 (in FIG. 6) for a new entry of the load buffer 54 can be derived from the results of the tag comparison 552 and the addresses of the LOADs already in the load buffer 54. Once written into the load buffer 54, the hit bit 60 (in FIG. 6) will not change. Thus, a newly dispatched LOAD is compared with the outstanding LOADs in the load buffer 54. The hit bit 60 (in FIG. 6) is altered on its way into the load buffer 54 if necessary. For example, if a LOAD missed the internal cache 51 and was accessing the external cache 55 when another LOAD to the same line with the same tag occurred, it is desirable to know up front to turn the latter LOAD into a hit so the load/store unit 50 would not go out to the external cache 55 for it. Similarly, if the second LOAD was to the same line, but it had the tag of the line resident in the internal cache 51, it is desirable to know it would be replaced by the outstanding LOAD so the load/store unit 50 could start an external cache 55 access for it before that actually happened.

Figure 6:
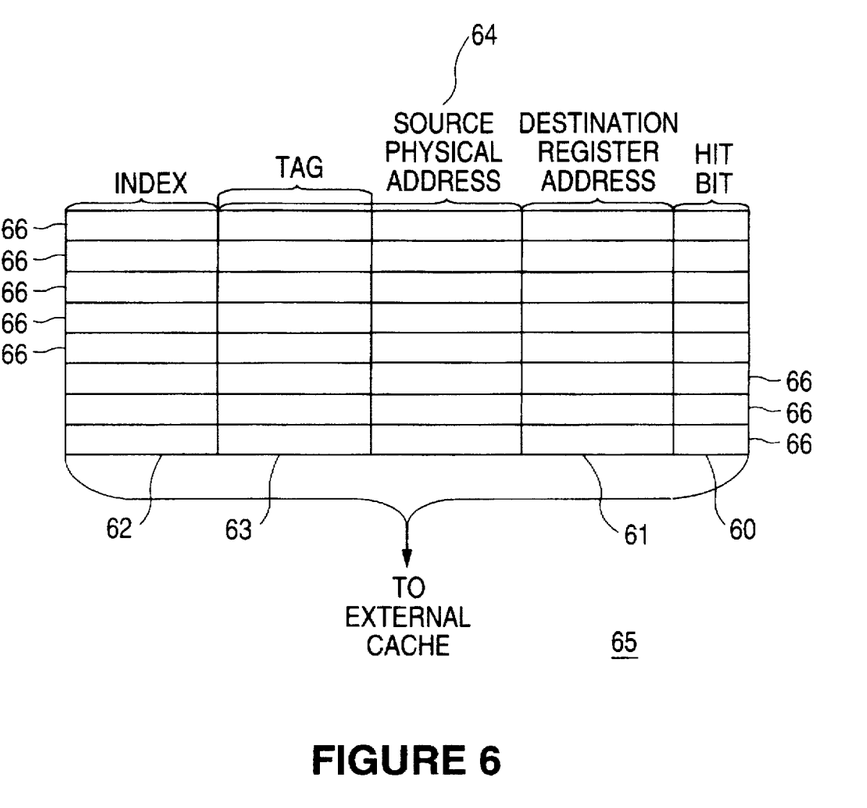
FIG. 6 shows the organization of data in the load buffer according to the present invention.

The organization of information in the load buffer 65 is as shown in FIG. 6. At a minimum, the load buffer 65 must store the destination register address 61, the index 62 into the internal cache 51 (in FIG. 5), the tag 63 associated with the memory address to be loaded, the hit bit 60, and the source address 64 of the memory address to be loaded. With regards to the source memory address 64 to be loaded, the load buffer 65 may store either the physical address or a virtual address, depending upon where in the architecture the virtual to physical translation occurs. In either case, either the tag 63 or the index 62 or both may be a subset of the source memory address 64. If the internal cache 51 (in FIG. 5) is virtually indexed and virtually tagged, the tag 63 and the index 62 essentially equal the virtual address. If the internal cache 51 (in FIG. 5) is physically indexed and physically tagged, the tag 63 and index 62 essentially equal the physical address. If the internal cache 51 (in FIG. 5) is virtually indexed and physically tagged, the tag 63 is the upper order bits of the physical address while the index 62 is the lower order bits of the virtual address. If the internal cache 51 (in FIG. 5) is physically indexed and virtually tagged, the tag 63 is the upper order bits of the virtual address while the index 62 is the lower order bits of the physical address. FIG. 6 shows the load buffer 65 data organization intended to be used with a virtually indexed, physically tagged internal cache 51 (in FIG. 5), and in which the virtual to physical address translation occurs prior to entry in the load buffer 65. The tag 63 is the upper order bits of the source physical address 64. The tag 63 is therefore is not independently stored.

When a newly dispatched LOAD must be queued in the load buffer 65, a calculation of the LOAD's hit bit 60 is performed. The "raw hit bit" value 552 (in FIG. 5) is determined by comparing the tag 63 RAM entry indexed by the LOAD address to the address's tag 63. The index 62 of the LOAD address is simultaneously compared to all the indexes 62 in the load buffer 65. For each entry 66 in the load buffer 65, the preceding comparisons produce an index match signal. Only those entries with an asserted index match signal can alter the raw hit bit value 552 (in FIG. 5). For the youngest entry with an asserted index match signal, the tag of the LOAD address is compared to the tag 63 of that youngest entry with an asserted index match signal. This generates a "tag match signal." For any entry 66, if the index match signal is asserted, the tag match signal is asserted, and the raw hit bit 552 (in FIG. 5) is deasserted, the hit bit 60 for the new LOAD becomes asserted. In this case, an older LOAD will fill the internal cache 51 (in FIG. 5) with the desired data by the time the newly dispatched LOAD reaches the head of the load buffer 551 (in FIG. 5). Thus, a miss is transformed into a hit. On the other hand, for any entry 66, if the index match signal is asserted, the tag match signal is deasserted, and the raw hit bit 552 (in FIG. 5) is asserted, the hit bit 60 for the new LOAD becomes deasserted. In this case, an older LOAD will write over the desired data by the time the newly dispatched LOAD reaches the head of the load buffer queue 552 (in FIG. 5). Thus, a hit is transformed into a miss. If multiple load buffer entries 66 have an asserted index match signal, the youngest entry controls the determination of the newly dispatched LOAD's hit bit 60. The logic described above is accomplished by the following rules. If any index matches are found in the load buffer 65, the hit bit 60 of the newly dispatched LOAD takes on the value of the tag 63 match signal of the youngest entry with a matching index 62. If no index matches are found in the load buffer 65, the hit bit takes on the value of the raw hit bit 552 (in FIG. 5).

Figure 7:
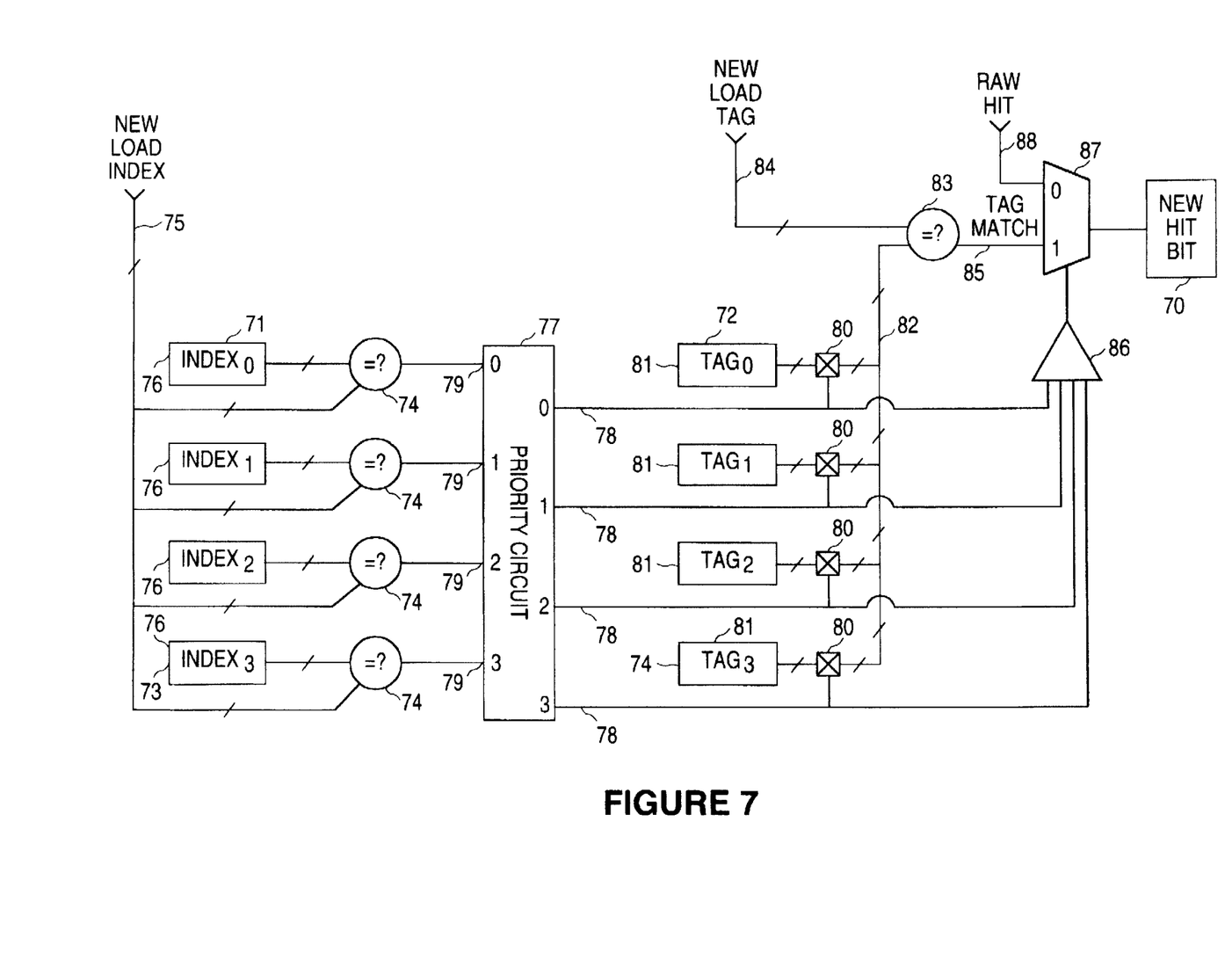
FIG. 7 is a simplified illustration of hardware which implements the calculation of the hit bit according to the present invention.

FIG. 7 shows a hardware structure which produces the value of the hit bit 70 for a new entry in a load buffer 65 (in FIG. 6) with four valid entries. In FIG. 7, INDEX0 71 and TAG0 72 represent the index 62 (in FIG. 6) and tag 63 (in FIG. 6) for the youngest entry, respectively, while INDEX3 73 and TAG3 74 represent the index 62 and tag 63 for the oldest entry, respectively. The comparators 74 compare the new load index 75 to all of those indexes 76 currently in the load buffer 65 (in FIG. 6). The priority circuit 77 asserts one or no outputs. Only the asserted match signal from the youngest entry is asserted at the outputs 78 of the priority circuit 77. If no input 79 is asserted, no output 78 is asserted. If one of the outputs 78 of the priority circuit 77 is asserted, the pass gates 80 drive the corresponding tag 81 onto the tag compare bus 82. The comparator 83 compares the new load tag 84 to the tag on the compare bus 82. If equality is detected the tag match signal 85 is asserted. If one or more of the indexes 76 have matched, the OR gate 86 directs the multiplexor 87 to select the tag match signal 85 for the hit bit value 70. If no indexes 76 matched, the OR gate 86 directs the multiplexor 87 to select the raw hit bit 88 as the hit bit value 70.

The hit bit calculation hardware described above is presented by way of example. There are many alternative logic implementation which accomplish the same objective. For example, the generation of a separate tag match signals for each load buffer entry could be performed to reduce the latency of the hit bit calculation at the expense of providing more comparators. The claims are intended to cover such numerous alternate embodiments.

The preferred embodiment of this invention embraces all of the features described above. FIG. 5 is a simplified block diagram illustrating the structure of the functional unit 50 according to the preferred embodiment. The functional unit 50 includes an internal first level cache 51 and an external second level cache 55. Both caches are direct mapped. The internal cache 51 (in FIG. 5) is separated into a tag RAM array 58 and a data RAM array 59. LOADs specify virtual addresses for the sources of the data requested. The tag RAM array 58 has two access ports 57 and 550. The first access port 57 is dedicated primarily to the retrieval of the tags 53 for incoming LOAD source addresses 553. The second access port 550 is dedicated primarily to writing the tags for memory locations which are being allocated into the internal cache 51. An allocation and tag retrieval can occur simultaneously, because of the two separate access ports 57 and 550.

The internal cache 51 is virtually indexed and physically tagged. The external cache 55 is physically indexed and physically tagged. Thus, the low order bits of the virtual address dictate the cache line in the internal cache 51, while the low order bits of the physical address dictate the cache line in the external cache 55. In both caches, the upper order bits of the physical address provide the tag. A translation lookaside buffer (TLB) 554 stores virtual to physical address translations. Since both caches 51 and 55 are physically tagged, the upper order bits 52 of the TLB output 555 are compared to the tag 53 retrieved from the tag RAM 58. If the comparator detects equality, the requested data is currently in the internal cache 51. If the load buffer 54 is empty, a cache hit can immediately return the data from the internal cache data RAM array 59. However, because all LOADs are required to return data in order, if the load buffer 54 is not empty, LOADs must be queued even if they hit the internal cache 51. If the load buffer 54 is not empty, it is because one or more older LOADs missed the internal cache 51. Thus, the subsequent LOADs must wait for the LOAD which missed the internal cache 51.

It is possible that the data requested by a LOAD which hit the internal cache 51 before being queued into the load buffer will be removed from the internal cache 51 by the time the LOAD reaches the head of the load buffer queue 551. Thus, a calculation occurs to predict whether or not the requested data will be available in the internal cache 51 at the time the LOAD reaches the head of the queue 551. The calculation involves the hit signal 552 generated by the comparator 556 as well as the indexes 62 (in FIG. 6) and tags 63 (in FIG. 6) of the LOADs being queued in the load buffer 54.

The present invention has been described and presented in terms of its preferred embodiment which includes its several related novel and non-obvious features. This embodiment is presented by way of example, and not by way of limitation. There are many equivalents to the inventive features which are intended to be covered by the appended claims without departing from the spirit and scope of the present invention.

What is claimed is:

1. A method of processing a load instruction for the contents of a memory address in a system with a direct mapped cache, comprising the steps of:

decoding the load instruction by a decoder;

dispatching the decoded load instruction;

servicing the dispatched decoded load instruction, including calculating whether or not the contents of the memory address will be resident in the direct mapped cache at a future time at which one or more older load instructions may have altered the direct mapped cache;

queuing the load instruction for the contents of the memory address in a load buffer;

waiting until all older load instructions have been processed; and in response to all older load instructions having been processed, accessing the direct mapped cache to retrieve the contents of the memory address if the calculating step determined that the contents of the memory address would be resident in the direct mapped cache.

2. A method as in claim 1, wherein the direct mapped cache has a tag array and a data array, wherein before the calculating step, the method further comprising the steps of:

retrieving a tag from a tag location in the tag array, wherein the memory address directly maps to the tag location; and determining whether or not the contents of the memory address is resident in the direct mapped cache at the time of the retrieval step.

3. A method as in claim 2, wherein the accessing step is performed without repeating the retrieving step.

4. A method as in claim 2, wherein the tag array is random access memory.

5. A method as in claim 4, wherein the tag array is dual-ported.

6. A method as in claim 2, wherein the data array is random access memory.

7. An apparatus for processing a load instruction for the contents of a memory address in a system with a direct mapped cache, comprising:

a decoder circuit that decodes the load instruction from an instruction stream;

a dispatcher circuit that dispatches the decoded load instruction; and a servicing circuit that services the dispatched decoded load instruction, including:

a calculation circuit for calculating whether or not the contents of the memory address will be resident in the direct mapped cache at a future time at which one or more older load instructions may have altered the direct mapped cache;

a queuing circuit for queuing the load instruction for the contents of the memory address in a load buffer;

a waiting circuit for waiting until all older load instructions have been processed; and an access circuit for accessing the direct mapped cache after all older load instructions have been processed to retrieve the contents of the memory address if the calculating circuit determined that the contents of the memory address would be resident in the direct mapped cache.

8. An apparatus as in claim 7, wherein the direct mapped cache includes a tag array and a data array, the apparatus further comprising:

a retrieval circuit for retrieving a tag from a tag location in the tag array, wherein the memory address directly maps to the tag location; and a determination circuit for determining whether or not the contents of the memory address is resident in the direct mapped cache at a time that the retrieval circuit performing the retrieving.

9. An apparatus as in claim 8, wherein the accessing circuit and retrieval circuit do not access the direct mapped cache and retrieve a tag, respectively, simultaneously.

10. An apparatus as in claim 8, wherein the tag array is random access memory.

11. An apparatus as in claim 10, wherein the tag array is dual-ported.

12. An apparatus as in claim 8, wherein the data array is random access memory.

* * * * *